United States Patent
Delaney et al.

(10) Patent No.: US 12,238,204 B1
(45) Date of Patent: Feb. 25, 2025

(54) SYSTEMS AND METHODS FOR IMPLEMENTING TRANSPARENT END-TO-END NETWORK PUBLIC-KEY ENCRYPTION

(71) Applicant: Berryville Holdings, LLC, Herndon, VA (US)

(72) Inventors: Christopher Edward Delaney, Front Royal, VA (US); Chava Louis Jurado, Chantilly, VA (US); Carl Bailey Jacobs, Fredericksburg, VA (US); William Theodore Schoon, Greer, SC (US)

(73) Assignee: Cyber IP Holdings, LLC, Herndon, VA (US)

( * ) Notice: Subject to any disclaimer, the term of this patent is extended or adjusted under 35 U.S.C. 154(b) by 297 days.

(21) Appl. No.: 17/557,248

(22) Filed: Dec. 21, 2021

Related U.S. Application Data

(60) Provisional application No. 63/131,342, filed on Dec. 29, 2020.

(51) Int. Cl.
*H04L 9/08* (2006.01)
*H04L 61/10* (2022.01)
*H04L 61/2503* (2022.01)

(52) U.S. Cl.
CPC ............ *H04L 9/0825* (2013.01); *H04L 9/085* (2013.01); *H04L 9/088* (2013.01); *H04L 61/10* (2013.01); *H04L 61/2503* (2013.01)

(58) Field of Classification Search
None
See application file for complete search history.

(56) References Cited

U.S. PATENT DOCUMENTS

| | | | |
|---|---|---|---|
| 2003/0147536 A1* | 8/2003 | Andivahis | H04L 63/0823 380/277 |
| 2007/0130464 A1* | 6/2007 | Swedor | G06F 21/602 713/170 |
| 2008/0118070 A1* | 5/2008 | Yeap | H04L 51/48 380/282 |
| 2009/0077383 A1* | 3/2009 | de Monseignat | H04L 9/3242 713/176 |

(Continued)

FOREIGN PATENT DOCUMENTS

WO    WO 2020237880 A1 * 12/2020

*Primary Examiner* — Bassam A Noaman
(74) *Attorney, Agent, or Firm* — Jones Day

(57) ABSTRACT

A network packet can be received at a host and it can be determined if such packet has a valid cryptographic public key for a destination host. If there is no known valid cryptographic public key, it is determined whether the network packet is a first network packet sent to the destination host, and if so, a queue is designated for network packets addressed to the destination host and a key management server is queried for a valid cryptographic public key associated with the destination host. Otherwise, the network packet is placed in a queue designated for the destination host until a valid cryptographic public key associated with the destination host becomes available. Upon a valid cryptographic public key associated with the destination host becoming available, the network packet is processed, encrypted and sent to the destination host.

21 Claims, 8 Drawing Sheets

(56) References Cited

U.S. PATENT DOCUMENTS

| | | | |
|---|---|---|---|
| 2016/0065543 A1* | 3/2016 | Muranaka | H04L 63/06 |
| | | | 713/168 |
| 2016/0094522 A1* | 3/2016 | Stuntebeck | H04L 51/18 |
| | | | 713/152 |
| 2018/0198606 A1* | 7/2018 | Le Saint | H04L 9/14 |
| 2020/0374374 A1* | 11/2020 | Deshpande | G06F 9/45558 |
| 2021/0266346 A1* | 8/2021 | Gordon | H04L 63/0245 |

* cited by examiner

SYSTEMS AND METHODS FOR IMPLEMENTING TRANSPARENT END-TO-END NETWORK PUBLIC-KEY ENCRYPTION

CROSS REFERENCE TO RELATED APPLICATION

This application claims priority to U.S. Pat. App. Ser. No. 63/131,342 filed on Dec. 29, 2020, the contents of which are hereby fully incorporated by reference.

BACKGROUND

Networks facilitate communication between entities. Confidentiality, security, and privacy interests may make it desirable to obfuscate characteristics of those communications. For example, content of communications across a public network may be protected via encryption of those communications. It may also be desirable to shield characteristics of the communicating entities, including aspects such as the identity of the communicating entities and their locations (e.g., physical or network locations).

End-to-end encryption of network traffic ensures that data in transit are protected from outside observation at points along the network path, even if an organization's traffic is not always traversing infrastructure that the organization controls.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
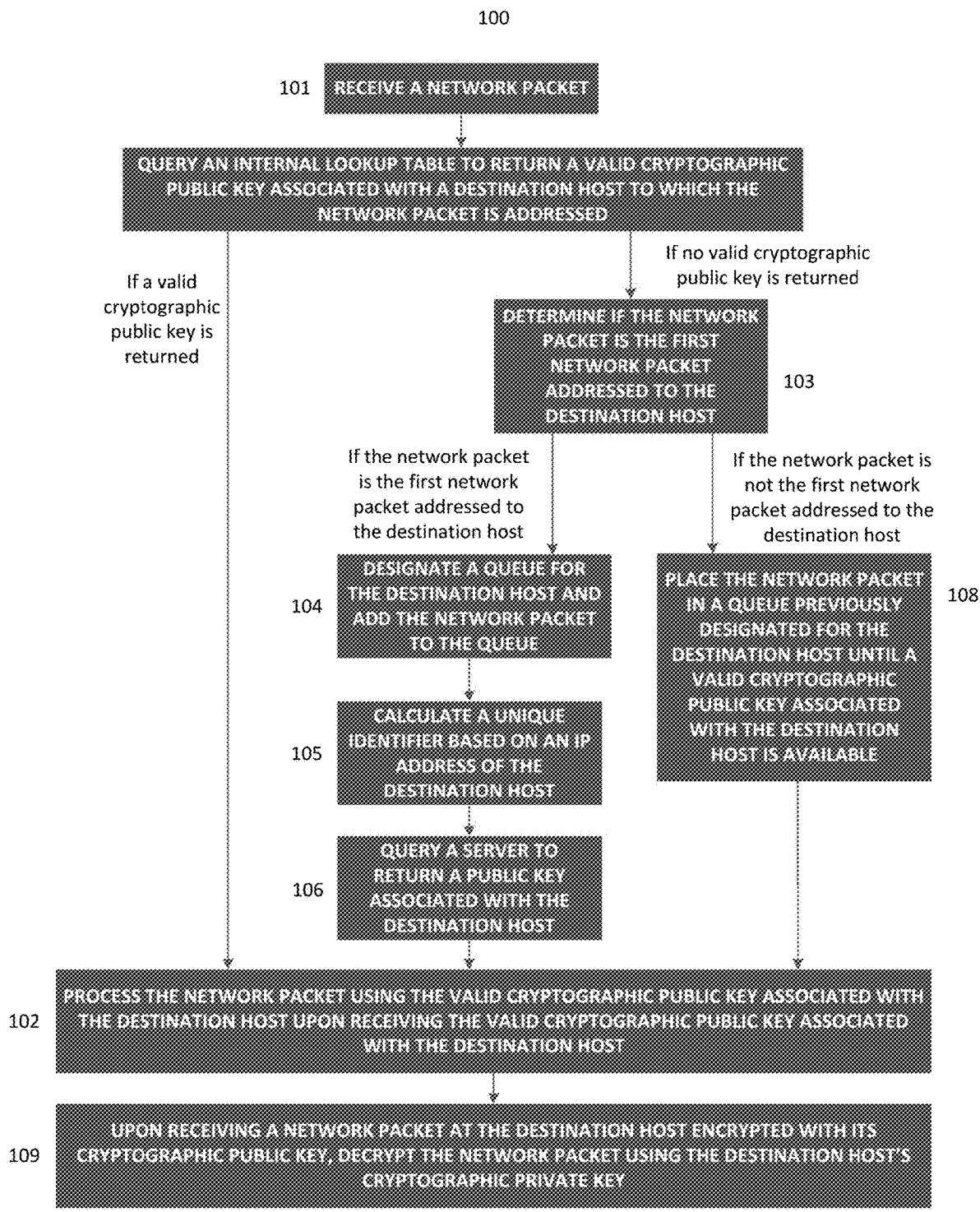
FIG. 1 is a flow diagram depicting an example computer implemented method to facilitate transparent end-to-end network public key encryption.

Computer network security is vital to its basic functionality. If traffic on a network may be compromised or observed by a third party, sensitive information may be revealed and become impossible to protect. This is particularly problematic in settings where sensitive and confidential information may be transmitted over infrastructure that is not always under the control of the transmitting corporation or organization.

End-to-end encryption of network traffic is used to protect information on such networks and prevent third parties from obtaining the content of the transmitted information. Example approaches to facilitate end-to-end network encryption and protect information transmitted over the network, include common keying among hosts, and unique keying for every pair of communicating hosts.

Under the common keying approach, all hosts are configured with a known pre-shared cryptographic key, which is used to facilitate encryption and decryption of traffic between hosts on the network. The common keying approach is a much less complex approach to end-to-end encryption compared to the unique keying approach. However, common keying is at risk of the entire network becoming compromised in the event that the common cryptographic key is exposed. Because all hosts in the network share the same cryptographic key under the common keying approach, if the key is exposed by any number of means, including external cryptological attack, leak via an insider threat, or because any one of the hosts have been compromised by an unauthorized person, all traffic on the network may be captured, viewed, recorded or otherwise compromised by an unauthorized third party.

The unique keying approach prevents the occurrence of such widespread compromise events upon the exposure of any one cryptographic key in the network that are possible under the common keying approach. In the event that an individual cryptographic key is compromised under the unique keying approach, only the data streams associated with that key may be observed, and the rest of the network remains secure. However, the unique keying approach requires an onerous level of configuration and maintenance.

Under the unique keying approach, a unique cryptographic keypair may be generated for each host participating on the network and a public key for each machine on the network may be distributed to all other hosts on the network before any hosts can communicate with each other. When a new host is added to the network, the new host may be configured with the existing public keys of all existing hosts on the network and the new host's public key may be distributed to the existing hosts. In the event that a key regeneration event occurs under the unique keying approach, a new keypair may be generated for every host and distributed to every other host on the network. If a single host does not undergo this process during a key regeneration event, all communications to and from that host may cease because the other hosts on the network may not be able to encrypt traffic in a way that host can decrypt, nor can the other hosts decrypt traffic that the overlooked host encrypted using outdated keys.

Systems and methods as described herein provide, in examples, mechanisms that provide unique-per-host end-to-end encryption, which automates key generation, distribution, and regeneration in such a way that hosts connected to the network server never need to be manually reconfigured to accommodate additional hosts or entire network rekey events. It also allows for automated rekeying to occur on an on-demand ad hoc basis, or on a predetermined schedule. In some embodiments, systems and methods herein provide transparent capture of network traffic in order to preemptively establish a cryptographic relationship with the destination host of that traffic before allowing the traffic to proceed. In some embodiments, a 1:1 overlay network is used to facilitate automated calculation of destination host addresses. Some embodiments enable the ability to add new hosts into an encrypted network and for them to begin operating immediately.

Systems and methods as described herein may operate in two modes, comprising a kernel network module mode (e.g., a wireguard mode), and a solo mode. In a kernel network module mode, the encryption of the network traffic itself is handed off to the kernel network module (e.g., a wireguard module), which is incorporated into the network driver stack of the underlying operating system. In a solo mode, network traffic handling (encryption and decryption) may be handled by a secure communication program (e.g., Charon) itself. Cryptographic key management (including creation, dissemination, and regeneration) is handled identically under both modes.

FIG. 1 is a flow diagram 100 depicting an example computer implemented method to facilitate transparent end-to-end network public key encryption. At 100, a network packet is received in a queue to be processed. Upon receiving the network packet, network metadata associated with the network packet is examined to determine an Internet Protocol (IP) address of a destination host. At 102, an internal lookup table or database is queried to determine whether there is an already known valid cryptographic public key associated with the destination host. If a valid cryptographic public key associated with the destination host exists, it is returned by the query.

If a known valid cryptographic public key associated with the destination host is returned by the query, the network packet is handed off to an internal handler in accordance with a mode (a kernel network module mode or a solo mode) in which the system is configured to run at 102 to be processed using the known valid cryptographic key.

If there is no known valid cryptographic public key associated with the destination host, it is determined whether this is a first packet destined for that host at 103. If the network packet is the first network packet addressed to the destination host, a queue is designated for the destination host and the network packet is added to the queue at 104. At 105, a unique identifier is calculated based on an IP address of the destination host. In some embodiments, the unique identifier is a cryptographic hash based on the destination IP address. In some embodiments, the cryptographic includes a shared secret (e.g., a string, a number representative of a network name). At 106, a key management server is queried to return a cryptographic public key associated with the unique identifier. In some embodiments, the key management server is running a Conclave key management server software, as described in U.S. Patent Application Nos. 62/666,424 and 16/401,498, both of which are incorporated by reference herein. At 102, the public key and all queued network packets addressed to the destination host are handed off to an appropriate traffic handler (either a kernel network module mode or a solo mode) to be processed.

If there is no known valid cryptographic public key associated with the destination host and the network packet is not the first network packet addressed to the destination host, the network packet is added to an internal queue already associated with the destination host at 108 until a valid cryptographic public key associated with the destination host is available. At 102, the public key and all queued network packets addressed to the destination host are handed off to an appropriate traffic handler (either a kernel network module mode or a solo mode) to be processed upon a valid cryptographic public key associated with the destination host becoming available.

At 109, the destination host decrypts the network packet using a cryptographic private key associated with the destination host upon the destination host receiving the network packet encrypted with a cryptographic public key associated with the destination host. In some embodiments, if the network packet contains a message indicating that a cryptographic public key associated with a sending host which sent the network packet is no longer valid, the destination host deletes the sending host's cryptographic public key from an internal key lookup table of the destination host. The destination host then treats subsequent traffic to the sending host as if it is a first network packet destined for the sending host.

Figure 2:
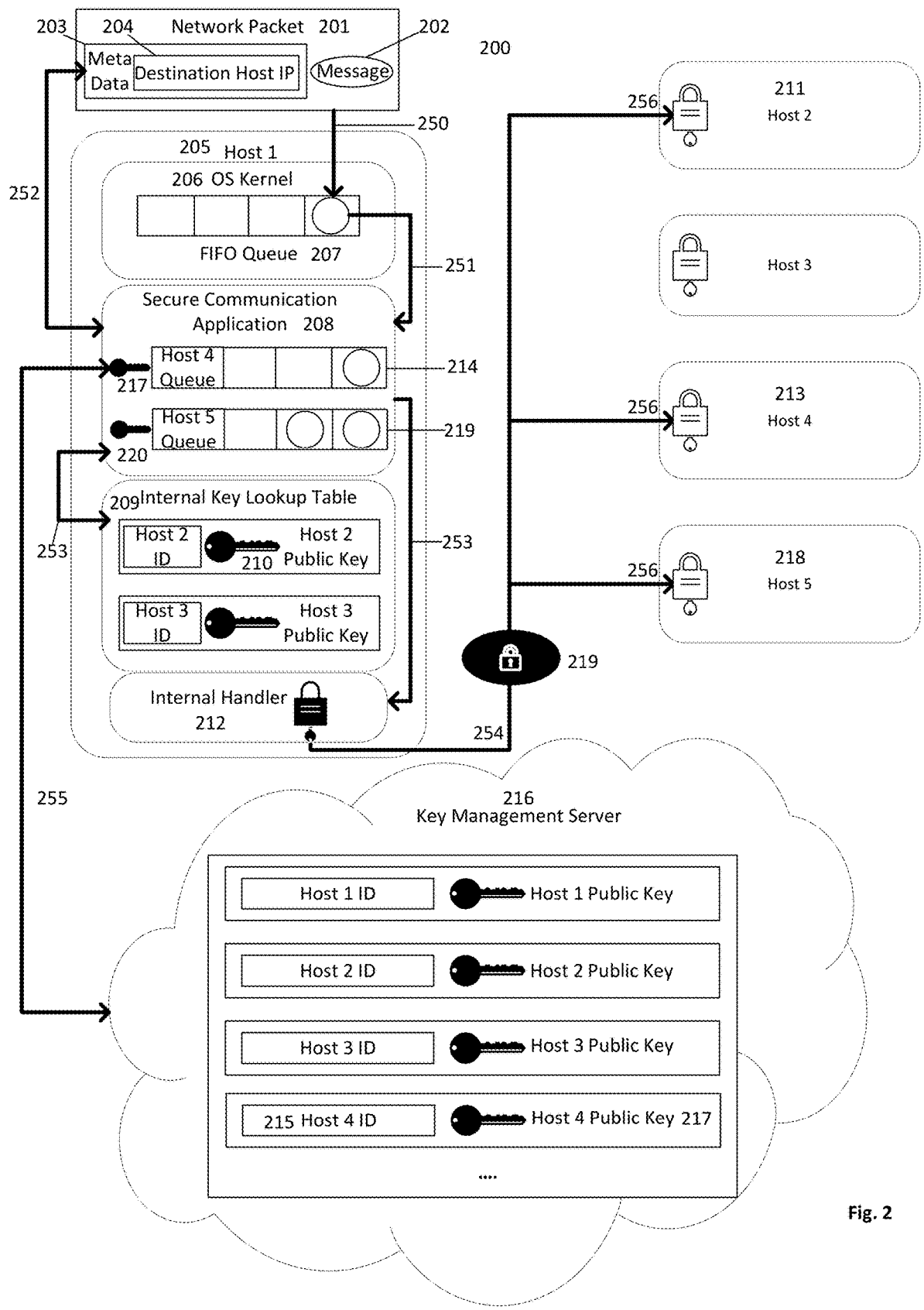
FIG. 2 is a block diagram depicting an example topology and set of operations to facilitate transparent end-to-end network public key encryption.

FIG. 2 is a block diagram 200 depicting an example topology and set of operations to facilitate transparent end-to-end network public key encryption. A network packet 201 contains a message 202 and metadata 203. The metadata 203 contains a destination host Internet Protocol (IP) address 204 of a destination host on the network to which the network packet 201 is addressed. At 250, the network packet 201 is received by a host 205 on the network. Upon receiving the network packet 201, an operating system kernel 206 of the host 205 places the network packet 201 on a first in first out queue 207.

At 251, a secure communication application (e.g., Charon) 208 running on the host 205 monitors the first in first out queue 207 and when the network packet 201 becomes available, the secure communication application 208 processes the network packet 201. At 252, the secure communication application 208 examines the metadata 203 of the network packet 201 to determine the destination host IP address 204 of the network packet 201. At 253, the secure communication application 208 queries an internal key lookup table 209 to determine whether there is already a known cryptographic key associated with the destination host.

If the internal key lookup table 209 contains a cryptographic public key 210 associated with a destination host 211, the secure communication application 208 hands the network packet 201 off to an internal handler 212 at 253. The internal handler 212 then sends the network packet 201 to the destination host 211 at 254 according to a designated traffic handler mode (a kernel network module mode or a solo mode).

If the internal key lookup table 209 does not contain a cryptographic public key associated with a destination host 213 and the network packet 201 is a first packet addressed to the destination host 213, the secure communication application 208 places the network packet 201 into a queue 214. At 255, the secure communication application 208 calculates a unique identifier 215 based on the destination host IP address 204 of the network packet 201 and queries a key management server 216 for a cryptographic public key 217 for the destination host 213. In some embodiments, the key management server is running a Conclave key management server software, as described in U.S. Patent Application Nos. 62/666,424 and 16/401,498, both of which are incorporated by reference herein. Upon receiving the cryptographic public key 217 for the destination host 213 from the key management server 216 at 255, the secure communication application 208 hands the network packet 201 to the internal handler 212 at 253. The internal handler 212 then sends the network packet 201 to the destination host 213 at 254 according to a designated traffic handler mode (a kernel network module mode or a solo mode).

If the internal key lookup table 209 does not contain a cryptographic public key associated with a destination host 218 and the network packet 201 is not a first packet addressed to the destination host 218, the secure communication application 208 places the network packet 201 into a queue 219 designated for the destination host 218. Upon receiving a public key 220 associated with the destination host 218, the secure communication application 208 then hands off any queued data packets in the queue 219 to the internal handler 212 at 253. The internal handler 212 then sends the network packet 201 to the destination host 213 at 254 according to a designated traffic handler mode (a kernel network module mode or a solo mode).

At 254, the internal handler 212 encrypts the network packet 201 before sending an encrypted network packet 219 over the network to the destination host (e.g., 211, 213, 218) according to the designated traffic handler mode. In some embodiments (e.g., a kernel network module mode), the internal handler 212 encrypts the network packet 201 using the cryptographic public key (e.g., 210, 217, 220) associated with the destination host (e.g. 211, 213, 218). In some embodiments (e.g., a solo mode), the network packet 201 is encrypted using a cryptographic symmetric key.

Upon receiving the encrypted network packet 219 at the destination host (e.g. 211, 213, 218) at 256, the encrypted network packet 219 is decrypted by the destination host (e.g. 211, 213, 218). In some embodiments, the destination host (e.g. 211, 213, 218) receives an encrypted packet 219 encrypted with a cryptographic public key (e.g., 210, 217, 220) of the destination host (e.g. 211, 213, 218), whereupon the encrypted packet 219 is decrypted using a cryptographic private key associated with the destination host (e.g. 211, 213, 218). In some embodiments wherein the encrypted network packet 219 is encrypted with a symmetric key, the destination host (e.g. 211, 213, 218) decrypts the encrypted network packet 219 using the symmetric key.

Figure 3:
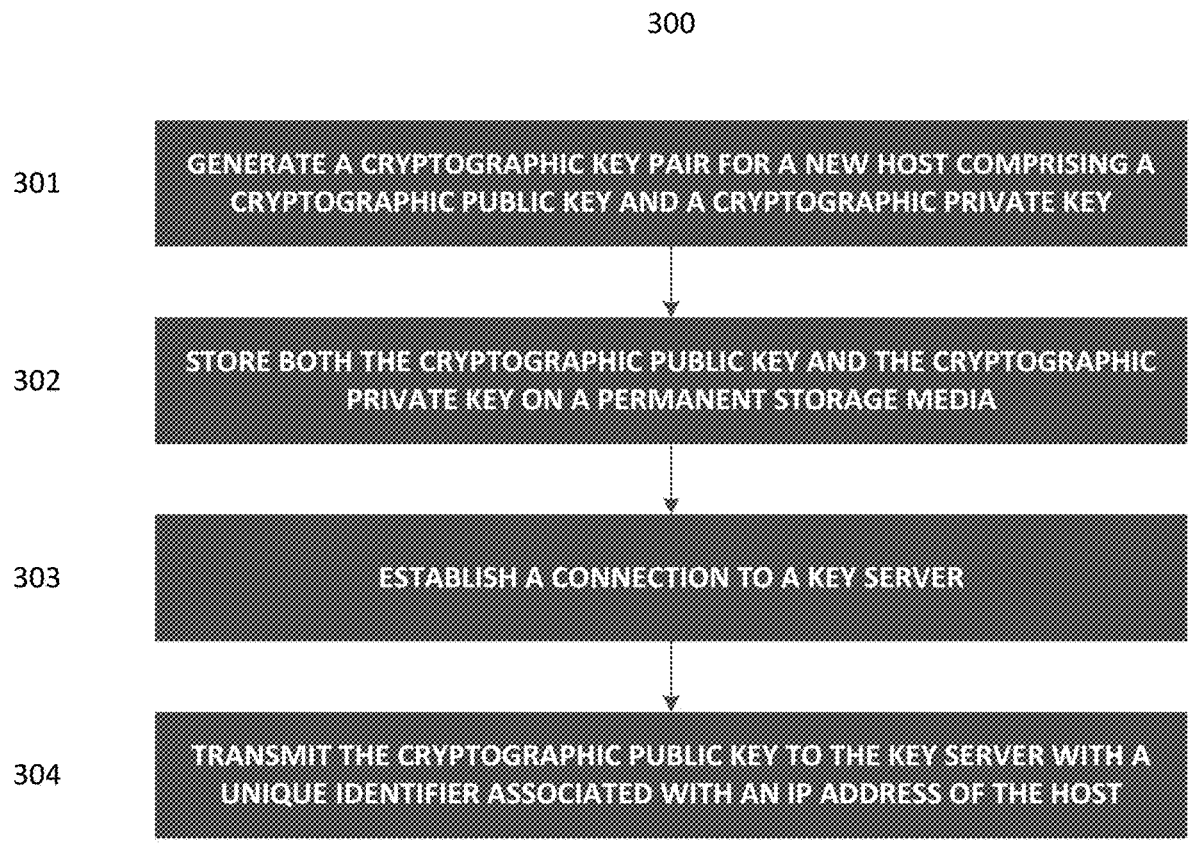
FIG. 3 is a flow diagram depicting an example computer implemented method for establishing a connection of a host to a transparent end-to-end network with public key encryption.

FIG. 3 is a flow diagram 300 depicting an example computer implemented method for establishing a connection of a host to a transparent end-to-end network with public key encryption. When a new host attempts to connect to the network, a secure communication application running on the host first generates a cryptographic key pair for itself at 301 comprising a cryptographic public key and a cryptographic private key for the host. At 302, the secure communication application stores the cryptographic key pair comprising the cryptographic public key and the cryptographic private key on a permanent storage media. At 303, the secure communication application establishes a connection to a key management server. In some embodiments, the key management server is running a Conclave key management server software, as described in U.S. Patent Application Nos. 62/666,424 and 16/401,498, both of which are incorporated by reference herein. At 304, the secure communication application transmits its own cryptographic public key to the key management server along with a unique identifier calculated by the secure communication application based upon an IP address of the host on which the secure communication application is running.

In embodiments, the secure communication application then executes commands which make use of available system configuration to direct network traffic that is destined for a particular destination host or set of destination hosts (e.g., an entire network or subnetwork) to be routed to a queue for processing and disposition by the secure communication program before being released to traverse a network. Thereafter, when a network packet, which would normally be sent to another host on the network is received by a network stack on the host running the secure communication application, an operating system kernel places the network packet on a first-in-first out queue, which is accessible to the secure communication application.

Figure 4:
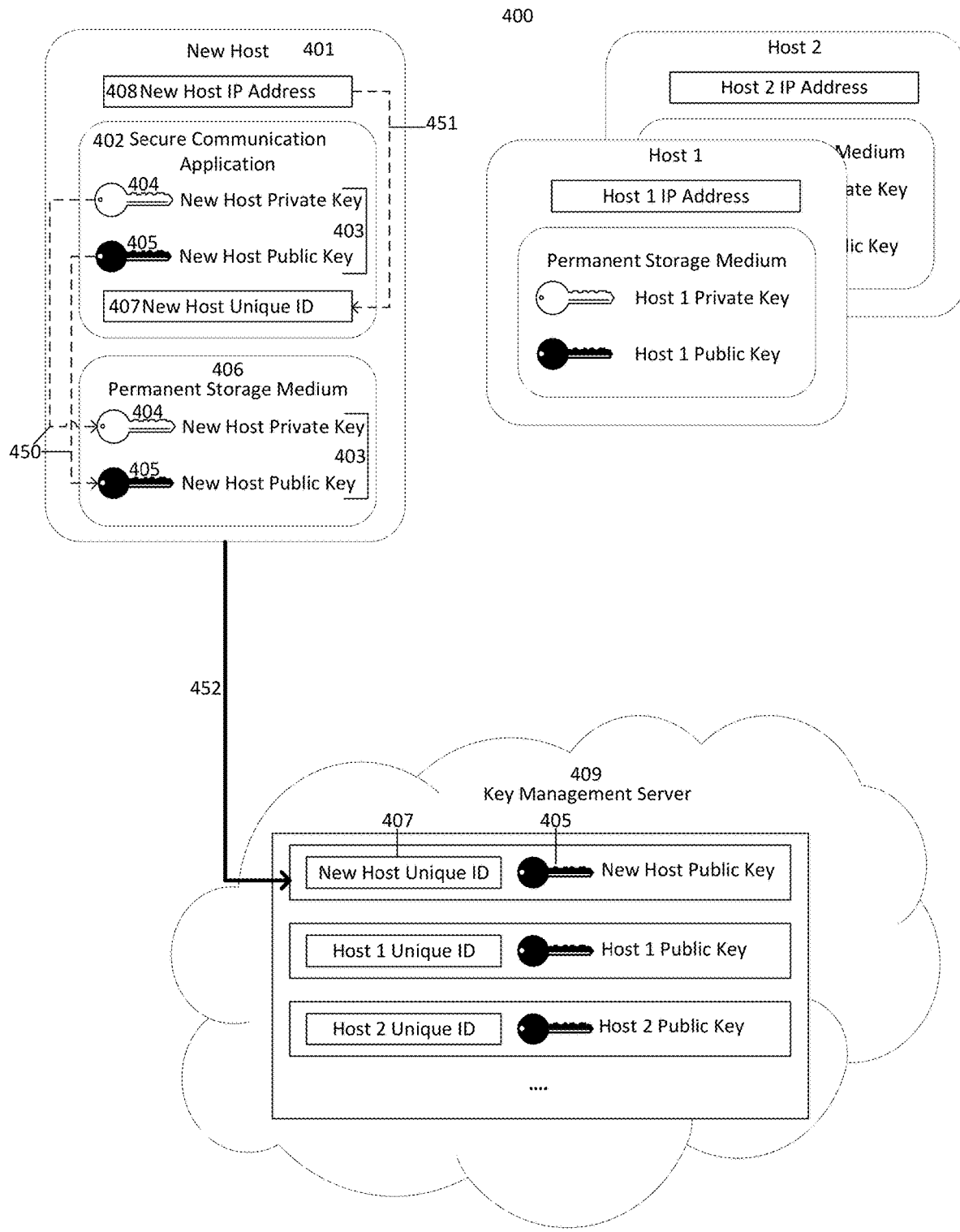
FIG. 4 is a block diagram depicting an example topology and set of operations for establishing a connection of a host to a transparent end-to-end network with public key encryption.

FIG. 4 is a block diagram 400 depicting an example topology and set of operations for establishing a connection of a host to a transparent end-to-end network with public key encryption. In the block diagram 400, a new host 401 establishes a connection to the transparent end-to-end network. A secure communication application 402 generates a cryptographic key pair 403 associated with the host 401 comprising a cryptographic private key 404 and a cryptographic public key 405. At 450, the secure communication application 402 stores the cryptographic key pair 403 associated with the host 401 at an accessible location on a permanent storage medium 406 on the host 401.

At 451, the secure communication application 402 calculates a unique identifier 407 for the host 401 based on an IP address 408 for the host 401. At 452, the secure communication application 402 establishes a client-server connection to a key management server 409. In some embodiments, the key management server is running a Conclave key management server software, as described in U.S. Patent Application Nos. 62/666,424 and 16/401,498, both of which are incorporated by reference herein. After establishing the connection at 452, the secure communication application 402 transmits the unique identifier 407 for the host 401 in association with the cryptographic public key 405.

Figure 5:
FIG. 5 is a flow diagram depicting an example computer implemented method to facilitate a key regeneration event to generate a new and different key pair for a host.

FIG. 5 is a flow diagram 500 depicting an example computer implemented method to facilitate a key regeneration event to generate a new and different key pair for a host. In some embodiments, the key regeneration event may be initiated ad hoc by a user. In some embodiments, the key regeneration event is initiated according to a configured schedule. Upon initiating the key regeneration event, in an example embodiment, a secure communication application running on a host executes the following steps.

At 501, the secure communication application receives a message initiating a key regeneration event from a user or a configured schedule. At 502, the secure communication application deletes the cryptographic key pair associated with the host on which the secure communication application is running comprising a cryptographic public key and a cryptographic private key. At 503, the secure communication application generates a new cryptographic key pair comprising a new cryptographic public key and a new cryptographic private key. At 504, the secure communication application transmits the new cryptographic key pair to a key management server in accordance with the key management server's application programming interface. In some embodiments, the key management server is running a Conclave key management server software. At 505, the secure communication application transmits a message to each destination host, with the message being individually encrypted with a cryptographic public key of each destination host, wherein the message indicates that the previous cryptographic public key for the host regenerating its cryptographic key is no longer valid.

At 506, upon receiving a network packet at a destination host encrypted with a cryptographic public key associated with the destination host, the network packet is decrypted using a cryptographic private key associated with the destination host. At 507, the destination host deletes a cryptographic public key associated with a sending host from which the network packet originated upon receiving a message indicating that the cryptographic public key associated with the sending host is no longer valid. At 508, the destination host treats subsequent traffic to the sending host as if it is the first network packet destined for that host.

Figure 6:
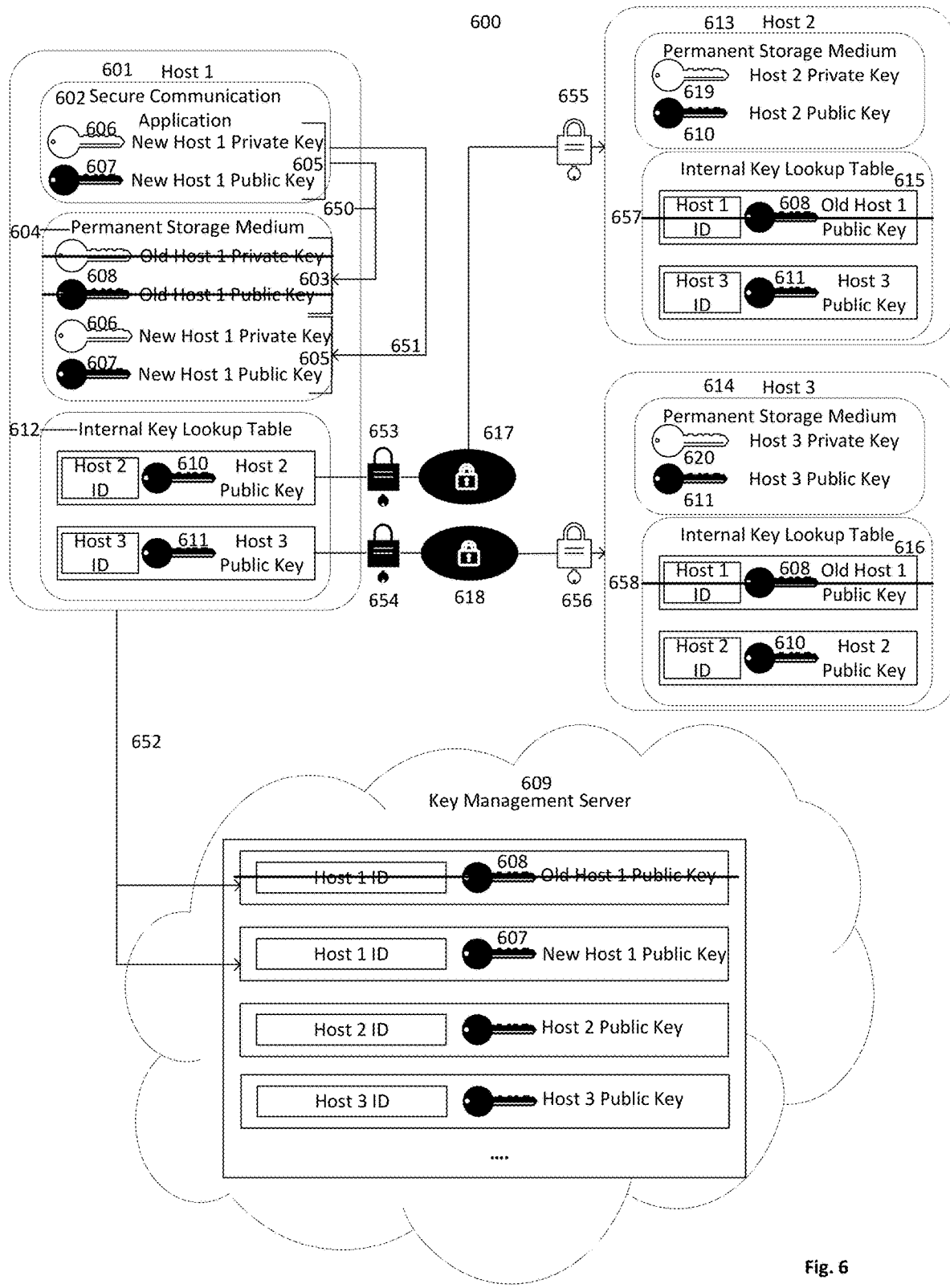
FIG. 6 is a block diagram depicting an example topology and set of operations to facilitate a key regeneration event to generate a new and different key pair for a host.

FIG. 6 is a block diagram 600 depicting an example topology and set of operations to facilitate a key regeneration event to generate a new and different key pair for a host 601. To begin a key regeneration event, the host 601 receives a message from a user or a configured schedule, wherein the message directs the host 601 to execute a key regeneration event. Upon receiving the message directing the host 601 to execute a key regeneration event, a secure communication application 602 running on the host 601 deletes an old cryptographic key pair 603 stored on a permanent storage medium 604 at 650. Upon deleting the old cryptographic key pair 603, the secure communication application 602 generates a new cryptographic key pair 605 corresponding to the host 601 comprising a new cryptographic private key 606 for the host 601 and a new cryptographic public key 607 for the host 601. At 651, the secure communication application 602 stores the new cryptographic key pair 605 comprising the new private key 606 and the new public key 607 on the permanent storage medium 604.

At 652, the secure communication application 602 deletes an old cryptographic public key 608 of the old cryptographic key pair 603 associated with the host 601 from a key management server 609. In some embodiments, the key management server is running a Conclave key management server software, as described in U.S. Patent Application Nos. 62/666,424 and 16/401,498, both of which are incorporated by reference herein. At 652, the secure communication application also transmits the new cryptographic public key 607 associated with the host 601 to the key management server 609 and stores the cryptographic public key 607 on the key management server 609.

In some embodiments, the secure communication application 602 accesses a cryptographic public key (e.g., 610, 611) corresponding to each other host (e.g. 613, 614) on the network from an internal key lookup table 612. At 653 and 654, the secure communication application 602 encrypts a message (encrypted network packets 617 and 618) to each other destination host (e.g., 613, 614) on the network using the cryptographic public key (e.g., 610, 611) associated with each host. The encrypted network packets 617 and 618 contain a message that the old cryptographic public key 608 associated with the host 601 stored on internal key lookup tables (e.g., 615, 616) of the other destination hosts (e.g., 613, 614) on the network is no longer valid. At 655 and 656, each of the destination hosts (e.g., 613, 614) decrypt the encrypted network packet (e.g., 617, 618) they receive using a cryptographic private key (e.g., 619, 620) associated with each destination host (e.g., 613, 614).

Upon receiving the message that the old cryptographic public key 608 associated with the host 601 is no longer valid, each destination host 613 and 614 delete the old cryptographic public key 608 from their respective internal key lookup tables 615 and 616 at 657 and 658. The destination hosts 613 and 614 treat any subsequent traffic to host 601 as if it is a first network packet addressed to host 601.

Figure 7:
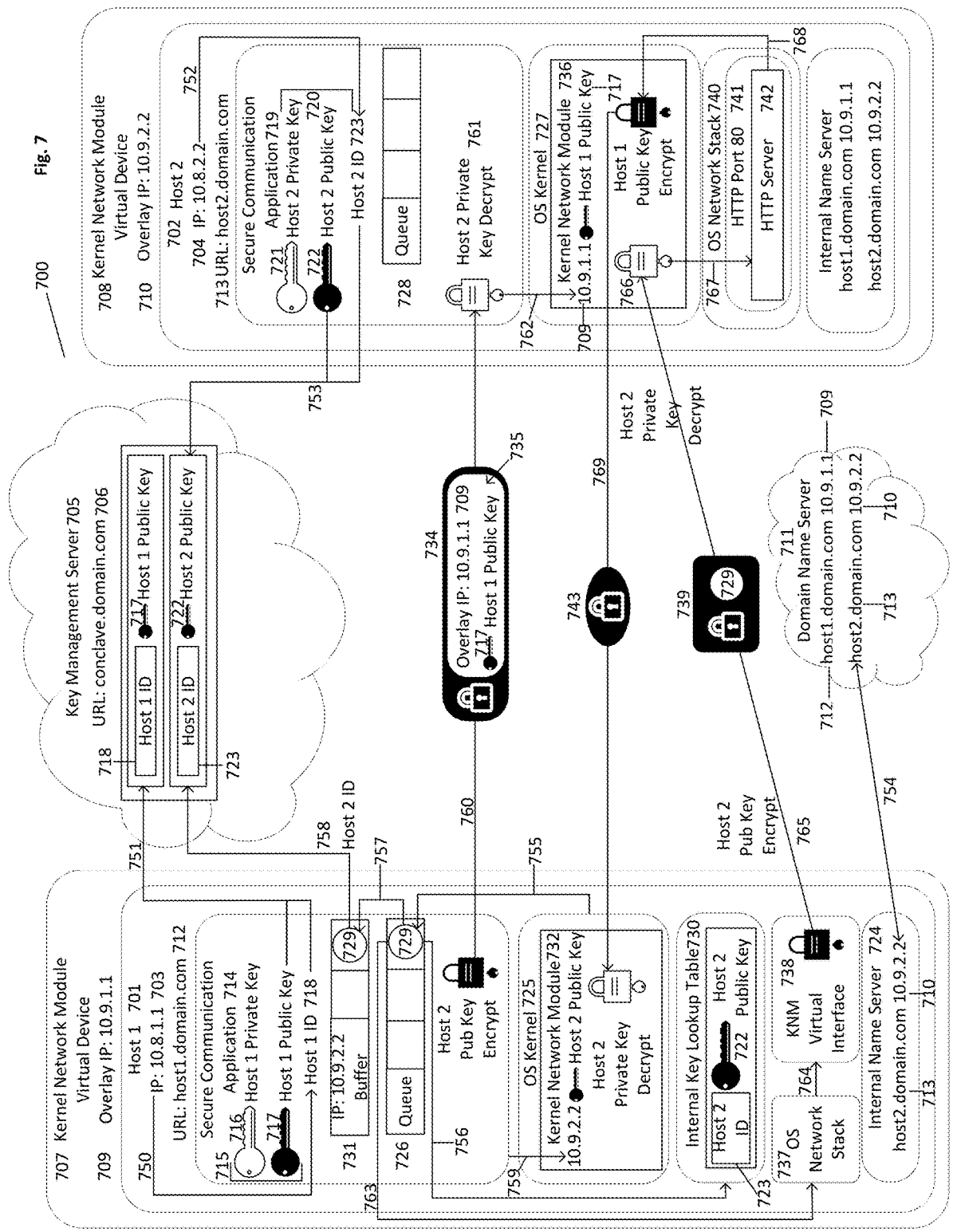
FIG. 7 is a block diagram depicting an example topology and set of operations to facilitate transparent end-to-end network public key encryption in a kernel network module mode.

FIG. 7 is a block diagram 700 depicting an example topology and set of operations to facilitate transparent end-to-end network public key encryption in a kernel network module mode. In the example block diagram 700, a host 701 and a host 702 are located on a network with a class-B network size of 16 bits (10.8.0.0/16), meaning that valid addresses for hosts on the network range from 10.8.0.0.1 to 10.8.255.254, with 10.8.255.255 being a reserved broadcast address for every host on the network. In the example block diagram 700, the host 701 has an IP address 703 of 10.8.1.1 and the host 702 has an IP address 704 of 10.8.2.2.

A key management server 705 is configured such that it is accessible by both host 701 and host 702. In some embodiments, the key management server 705 is configured to run a Conclave key management server software, as described in U.S. Patent Application Nos. 62/666,424 and 16/401,498, both of which are incorporated by reference herein. In some embodiments, the key management server is on the same network as the host 701 and the host 702. In some embodiments, the key management server may be located on a separate network from host 701 and host 702, but still accessible by both host 701 and host 702. In some embodiments, the key management server may be accessed by host 701 and host 702 by a resolvable network name 706, such as, for example, "concalve.domain.com." Both host 701 and host 702 are configured to use key management server 705 as their key management server at startup. In some embodiments, the host 701 and the host 702 are configured to use the key management server 705 using the resolvable network name 706 of the key management server 705.

The host 701 and the host 702 have a kernel network module virtual network device 707 and 708 configured for each host, respectively. In some embodiments, the kernel network module virtual network devices 707 and 708 are configured with an overlay IP address 709 and 710 that match the underlying physical IP addresses 703 and 704 of the host 701 and the host 702, respectively, mapped to a 1:1 overlay network address space. For example, if an underlying network address space is 10.8.0.0/16 and the overlay network address space is 10.9.0.0/16, then a host with a physical network IP address of 10.8.1.22 would have a kernel network module virtual network device configured with an IP address of 10.9.1.22. In the example block diagram 700, the kernel network module virtual network device 707 associated with host 701 has an overlay IP address 709 of 10.9.1.1, corresponding to the IP address 703 for the host 701 of 10.8.1.1. The kernel network module virtual network device 708 associated with host 702 has an overlay IP address 710 of 10.9.2.2, corresponding to the IP address 704 for the host 702 of 10.8.2.2.

A domain name server 711 is configured to return the overlay IP addresses (e.g., 709, 710) in the overlay network (10.9.0.0/16) for all hosts on the network (e.g., 701, 702). Each listing in the domain name server 711 corresponds to a single host, containing a hostname and an associated overlay IP address for a corresponding kernel network module virtual network device for each host. For example, the host 701 is listed in the domain name server 711 as a hostname 712 associated with the host 701 of the example hostname "host1.domain.com" along with the overlay IP address 709 associated with the host 701. The host 702 is listed in the domain name server 711 as a hostname 713 associated with the host 701 of the example hostname "host2.domain.com" along with the overlay IP address 710 associated with the host 702.

When a host, such as the host 701 starts up for the first time, a secure communication application 714 running on the host 701 determines that this is the first time the secure communication application 714 has been run, meaning the host 701 does not have any cryptographic keys associated with it yet. The secure communication application 714 then determines from a configuration file that it will operate in a kernel network module mode. The secure communication application 714 then directs an underlying operating system kernel 725 to direct any network packets addressed to hosts on the overlay network (for example, addressed to an overlay IP address 10.9.x.x) to a queue 726 accessible by the secure communication application 714. The secure communication application 714 then generates a cryptographic key pair 715 associated with the host 701 comprising a cryptographic private key 716 and a cryptographic public key 717. At 750, the secure communication program 711 creates a unique identifier 718 associated with the host 701 based on a cryptographic hash of the IP address 703 and a previously configured network name.

At 751, the secure communication application 714 establishes a connection to the key management server 705, creates an account for itself using an API of the key management server 705, and registers the host 701 using the unique identifier 718 associated with the host 701. Also at 751, the secure communication application 714 uploads the cryptographic public key 717 associated with the host 701 to the key management server 705, where it is stored in relation to the unique identifier 718 associated with the host 701. After uploading the cryptographic public key 717 to the key management server 705, the secure communication application 714 goes dormant and waits for network traffic addressed to any host on the 10.9.x.x network.

The host 702 undergoes the same process when it starts up for the first time. A secure communication application 719 running on the host 702 determines this is the first time it has been run determines that it will operate in a kernel network module mode from a configuration file. The secure communication application 714 then directs an underlying operating system kernel 727 to direct any network packets addressed to hosts on the overlay network (for example, addressed to an overlay IP address 10.9.x.x) to a queue 728 accessible by the secure communication application 714. The secure communication application 719 then generates a cryptographic key pair 720 comprising a cryptographic private key 721 and a cryptographic public key 722 associated with the host 702. At 752, the secure communication application creates a unique identifier 723 associated with the host 702 based on a cryptographic hash if the IP address 704 of the host 702 and a previously configured network name.

At 753, the secure communication application 719 establishes a connection to the key management server 705, creates an account for itself using an API of the key management server 705, and registers host 702 using the unique identifier 723. Also at 751, the secure communication application 719 uploads the cryptographic public key 722 associated with the host 702 to the key management server 705, where it is stored in relation to the unique identifier 723 associated with the host 702. After uploading the cryptographic public key 722 to the key management server 705, the secure communication application 719 goes dormant and waits for network traffic addressed to any host on the 10.9.x.x network.

When a user on a host on the network wishes to access a network resource on another host, the following process occurs. In the following example, a user on the host 701 accesses a network resource on the host 702, however, the process may be executed between any two hosts on the network. The user on the host 701 first enters the hostname 713 of the host 702 with which the user wishes to communicate. In some embodiments, the host 701 does not know the overlay IP address 710 of the host 702. Therefore, the host 701 queries the domain name server 711 for the overlay IP address 710 associated with the hostname 713 of the host 702 at 754. The domain name server 711 returns the overlay IP address 710 in response to the query. In some embodiments, the host 701 stores the overlay IP address 710 and the corresponding hostname 713 of the host 702 on an internal name server 724 located on the host 701.

Upon receiving the overlay IP address associated with the host 702, the host 701 attempts to establish a connection to the kernel network module virtual network device 708 associated with the host 702. The host 701 attempts to make the connection through the kernel network module virtual network device 707 because the overlay IP 710 conveys to the host 701 that it is communicating on an overlay network, meaning its kernel network module virtual network device 707 on the overlay network should be used. At 755, an initial network packet 729 addressed from the overlay IP address 709 (10.9.1.1) of the kernel network module virtual network device 707 to the overlay IP address 710 (10.9.2.2) of the kernel network module virtual network device 708 is placed into the queue 726 accessible by the secure communication application 714.

At 756, the internal communication application 714 then extracts a destination address (Overlay IP address 710) from the packet and queries an internal key lookup table 730 to determine if the overlay IP address 710 is a known host with which it has previously communicated. If previous communication with the overlay IP address 710 had occurred, the overlay IP address 710 exists as an entry to the internal key lookup table 730 along with the cryptographic public key 722 of the host 702 associated with the kernel network module virtual network device 708.

If the internal key lookup table does not contain an entry for the overlay IP address 710, the secure communication application 714 obtains the cryptographic public key 722 of the associated host 702. To obtain the cryptographic public key 722, the secure communication application places the network packet 729 and any subsequent packets addressed to the overlay IP address 710 into a buffer 731 associated with the overlay IP address 710 at 757. At 758, the secure communication application 714 calculates the unique identifier 723 for the host 702 to which the network packet 729 is addressed based on the network name and the overlay IP address 710 and queries the key management server 705 for the cryptographic public key 722 associated with the host 702 using the newly calculated unique identifier 723 associated with the host 702. The host 701 then awaits a response from the key management server 705.

Upon receiving the cryptographic public key 722 associated with the destination host 702, whether from the internal key lookup table 730 at 756 or from the key management server at 758, the secure communication application 714 configures a kernel network module 732 to indicate that the overlay IP address 710 is associated with the cryptographic public key 722 at 759. In some embodiments, the kernel network module (e.g., a wireguard module) may be a third-party software package. The secure communication application then calculates the underlying physical network address of the overlay IP address 710 (10.9.2.2), resulting in calculating the IP address 704 (10.8.2.2) of the host 702. Upon calculating the IP address 704, the secure communication program crafts and encrypts a network packet 734 and sends the network packet 734 to the host 702 at 760. The network packet 734 contains a message 735 containing the overlay IP address 709 and the cryptographic public key 717 associated with the host 701. The network packet 734 is encrypted with the cryptographic public key 722 associated with the host 702 at 760.

At 761, the secure communication application 719 running on the host 702 decrypts the network packet 734 using the cryptographic private key 721 associated with the host 702 upon receiving the network packet 734. After decrypting the network packet 734, the secure communication application 719 configures a kernel network module 736 on the host 702 at 762 indicating that the overlay IP address 709 is associated with the cryptographic public key 717 associated with the host 701. At this point, both hosts are capable of encrypted communication with each other.

After establishing a connection, the secure communication program 714 dequeues the network packet 729 from the queue 726 along with any other packets in the queue 726 waiting for the connection to host 702 to become available and hands the network packet 729 and any other network packets from the queue 726 off to an operating system network stack 737 to process at 763. At 764, the network packet 729 and any other network packets from the queue 726 are sent to the kernel network module virtual interface device 738.

At 765, the kernel network module Virtual Interface 738 sends the network packet 729 and any other network packets from queue 726 to the kernel network module Instance 736 associated with the host 702 using a kernel network module encryption protocol. Under a kernel network module encryption protocol, the network packet 729 and any other network packets from queue 726 are each encrypted at 765 using the cryptographic public key 722 associated with the host 702 and sent as an encrypted network packet(s) 739. At 766, the encrypted network packet(s) is received by the kernel network module 736 and decrypted using the private key 721 corresponding to the host 702 and a resulting decrypted network packet(s) is handed off to an operating system network stack 740 of the host 702 at 767.

At 767, the kernel network module 736 hands the decrypted network packet(s) off to an HTTP port 741 (for example, HTTP port 80 in some embodiments) on the operating system network stack 740 and are received by an HTTP server 742 on the host 702.

In some embodiments, the HTTP server 742 on the kernel network module virtual network device 708 responds to the kernel network module virtual network device 707, which sent the encrypted network packet 739. A response network packet is then handed to the kernel network module 736 at 768. The response network packet is then encrypted with the public key 717 corresponding to the host 701 to create an encrypted response network packet 743, which is sent to the kernel network module 732, where the encrypted response network packet 743 is decrypted using the cryptographic private key 721 associated with the host 702 and handed off to an appropriate application (for example, a web browser in some embodiments).

Figure 8:
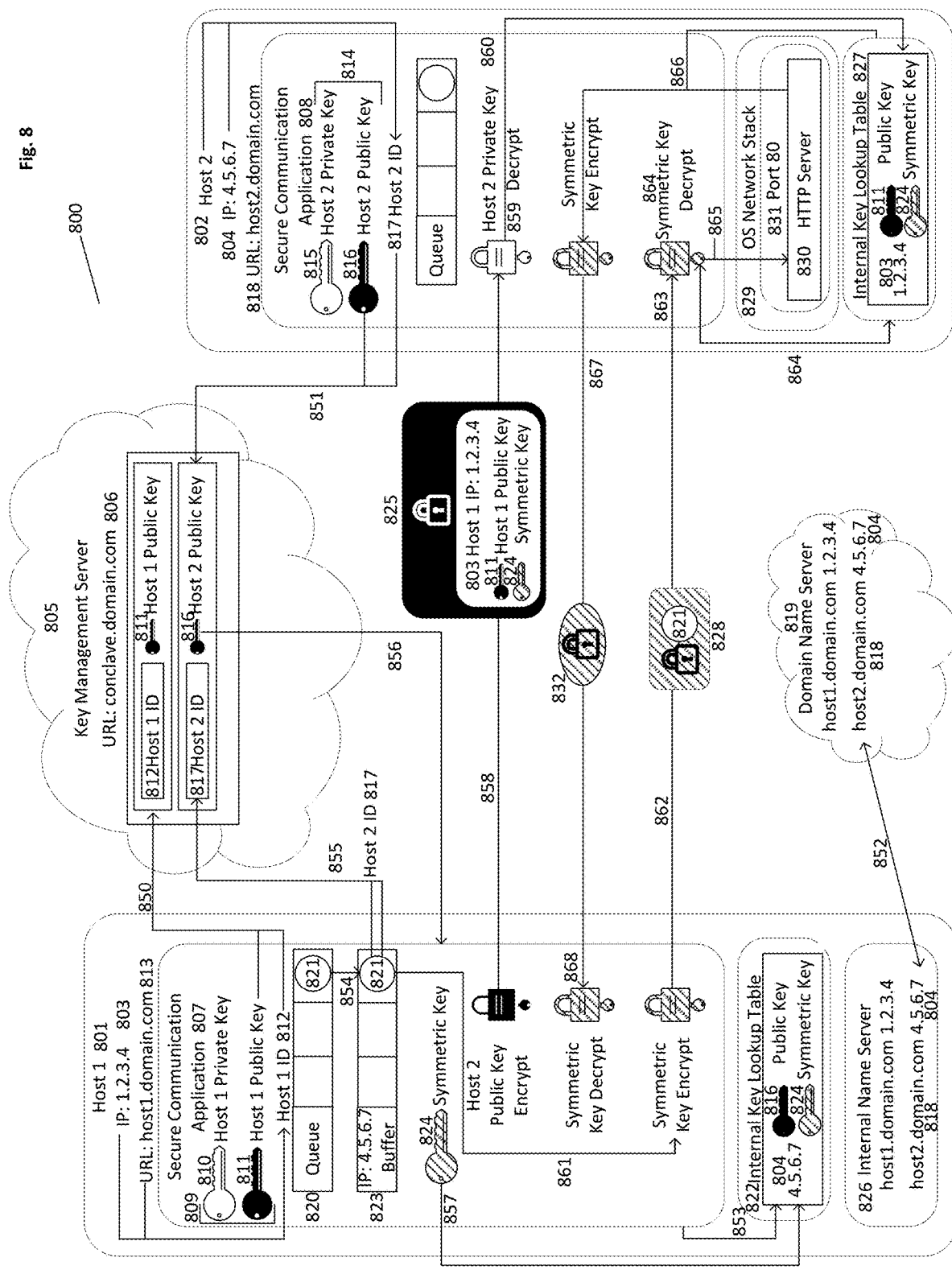
FIG. 8 is a block diagram depicting an example topology and set of operations to facilitate transparent end-to-end network public key encryption in solo mode.

FIG. 8 is a block diagram 800 depicting an example topology and set of operations to facilitate transparent end-to-end network public key encryption in a solo mode. In a solo mode, no overlay network is used. Therefore, it is possible to use a solo mode to secure communications between hosts that do not share a common local area or wide area network.

In the block diagram 800, the example topology and operations secure communications between a host 801 and a host 802, which may be located on disparate networks. The host 801 has an IP address 803 (1.2.3.4) and the host 802 has an IP address 804 (4.5.6.7).

A key management server 805 is configured on a network. In some embodiments, the key management server 805 is configured with an internet connection. In some embodiments, the location of the key management server 805 does not matter as long as the key management server 805 is accessible via the network from both the host 801 and the host 802. In some embodiments, the host 801 and the host 802 may access the key management server 805 using a resolvable network name 806 (e.g., conclave.domain.com) of the key management server 805. In some embodiments, the key management server 805 is running a Conclave key management server software, as described in U.S. Patent Application Nos. 62/666,424 and 16/401,498, both of which are incorporated by reference herein.

Hosts on the network are configured to execute a secure communication application at startup. The host 801 is configured to execute a secure communication application 807 at startup and the host 802 is configured to execute a secure communication application 808 at startup. The host 801 and the host 802 are each configured to use the key management server 805 as their key exchange server. In some embodiments, the host 801 and the host 802 are configured to use the key management server 805 by use of the resolvable network name 806 of the key management server 805.

Upon the host 801 starting up and executing the secure communication application 807 for the first time, the secure communication application 807 determines that this is the first time it has been run and that the host 801 therefore has no cryptographic keys associated with it. The secure communication application 807 then determines from a configuration file that it will operate in a solo mode. The secure communication application generates a cryptographic key pair 809 comprising a cryptographic private key 810 and a cryptographic public key 811 suitable for use with a kernel network module. A unique identifier 812 for the host 801 is created by the secure communication application 807 based on a cryptographic hash of the IP address 803 of the host 801 and a network name 813 of the host 801. In some embodiments, the network name 813 is configured by a system administrator.

At 850, the secure communication application 807 establishes a connection to the key management server 805 and creates an account for the host 801. In some embodiments, the account is created using an API for the key management server 805. The secure communication application 807 registers the host 801 with the key management server 805 with the unique identifier 812 and uploads the public key 811 to the key management server 805 to be associated with the unique identifier 812. The secure communication application 807 then goes dormant and waits for network traffic destined for any external host.

When the host 802 starts up and executes the secure communication application 808 for the first time, it follows the same steps. The secure communication application 808 determines that this is the first time it has been run and that the host 802 therefore has no cryptographic keys associated with the host 802. The secure communication application 808 generates a cryptographic key pair 814 comprising a cryptographic private key 815 and a cryptographic public key 816 suitable for use with a kernel network module. A unique identifier 817 for the host 802 is created by the secure communication application 808 based on a cryptographic hash of the IP address 804 of the host 802 and a network name 818 of the host 802. In some embodiments, the network name 813 is configured by a system administrator.

At 851, the secure communication application 808 establishes a connection to the key management server 805 and creates an account for the host 802. In some embodiments, the account is created using an API for the key management server 805. The secure communication application 808 registers the host 802 with the key management server 805 with the unique identifier 817 and uploads the public key 816 to the key management server 805 to be associated with the unique identifier 817. The secure communication application 808 then goes dormant and waits for network traffic destined for any external host.

When a user on the host 801 wishes to access a network resource on the host 802, the user enters a network name 818 associated with the host 802. The host 801 does not know the IP address 804 associated with the host 802. Therefore, at 852, the host 801 queries a domain name server 819, which responds as configured and indicates that the network name 818 has an IP address 804 associated with it. The network name 818 and the IP address 804 returned by the domain name server are then stored on an internal name server 826

The host 801 then attempts to initiate a connection to the IP address 804. At startup, the secure communication application 807 had directed an underlying operating system kernel to direct traffic to external hosts to a queue 820 with which the secure communication application 807 can interact. The secure communication application 807 receives a network packet 821 to be sent from the host 801 to the host 802 and places it in the queue 820, where it extracts a destination address for the network packet 821, which in this example is the IP address 804 corresponding to the destination host 802. At 853, the secure communication application 807 queries an internal key lookup table 822 on the host 801 to determine if it contains the IP address 804, which would indicate that the host 802 associated with the IP address 804 is a known host with which it has already communicated. The first time a network packet is sent to the host 802, the internal key lookup table 822 does not contain an entry for the host 802 containing the IP address 804. Therefore, the secure communication application 807 determines it should obtain the public key 816 associated with the host 802.

At 854, the secure communication application 807 places the network packet 821 and any subsequent packets it receives that are addressed to the IP 804 into a buffer 823 associated with the host 802. At 855, the secure communication application 807 calculates the unique identifier 817 associated with the host 802 based on a cryptographic hash of the IP address 804 of the destination host 802 to which the network packet 821 is addressed and the network name. Also at 855, the secure communication application queries the key management server 805 using the unique identifier 817 that it just calculated, requesting the public key 816 associated with the host 802 and waits for a response. At 856, the public key 816 associated with the host 802 and the corresponding unique identifier 817 is returned to the secure communication application 807 from the key management server 805.

Upon receiving the public key 816 at 856, the secure communication application 807 generates a symmetric key 824 to be used in communication between the host 801 and the host 802. At 857, the symmetric key 824 and the public key 816 associated with the host 802 are stored in the internal key lookup table 822 in relation with the IP address 804 associated with the host 802.

At 858, the secure communication application 807 creates a message 825 containing the IP address 803 and the public key 811 of the host 801 along with the symmetric key 824 to be used to communicate between the host 801 and the host 802. The message 825 is encrypted with the public key 816 for the host 802 and sent to the host 802 at 858. The message 825 is received by the secure communication application 808 and decrypted at 859 using the private key 815 associated with the host 802. After receiving and decrypting the message 825 at 859, the secure communication application 808 creates an entry in an internal key lookup table 827 on the host 802 wherein the public key 811 of the host 801 and the symmetric key 824 for communication between the host 801 and the host 802 are stored in relation with the IP address 803 of the host 801. At this point, the host 801 and the host 802 are able to communicate with each other in a solo mode.

At 861, the secure communication application 807 dequeues the network packet 821 from the buffer 823 along with any other network packets in the buffer 823 waiting for a connection to the host 802 to become available. For each packet from the queue 823 addressed to the IP address 804 associated with the host 802, the secure communication application 807 encrypts the packet 821 using the symmetric key 824 generated for communication between the host 801 and 802 at 861. At 862, the secure communication application 807 sends an encrypted network packet 828 comprising the network packet 821 encrypted with the symmetric key 824 to the secure communication application 808 running on the host 802.

The secure communication application 808 running on the host 802 receives the encrypted packet 828 at 863. At 864, the secure communication application 808 determines that the host 801 sent the encrypted network packet 828 and its associated IP address 803. Upon determining the IP address 803 of the sending host 801 at 864, the secure communication application 808 queries an internal key lookup table 827 using the IP address 803 of the host 801 which sent the network packet 828 and returns the symmetric key 824 generated for communication between the host 801 and the host 802. Upon receiving the symmetric key 824, the secure communication application 808 decrypts the encrypted network packet 828 using the symmetric key 824.

At 865, the network packet 821 comprising a decrypted product of the encrypted network packet 828 is placed into a network stack 829 of an underlying operating system using a raw socket. The network packet 821 is received by an HTTP server 830 on a port 831 (e.g., Port 80) on the host 802 and given to a process listening on port 831.

When the HTTP Server 830 on the host 802 responds to the host 801, the secure communication application 808 determines there is an established relationship with the host 801 by locating the IP address 803 associated with the host 801 as an entry in the internal key lookup table 827 at 866 and using the associated symmetric key 824 for communication between the host 801 and the host 802 to encrypt a network packet to be sent to the host 801. At 867, the secure communication application 808 sends an encrypted network packet 832 to the secure communication application 807 on the host 801. Upon receiving the encrypted network packet 832 at 868, the secure communication application 807 decrypts the encrypted network packet 832 using the symmetric key 824 stored in the internal key lookup table 824 for communication between the host 801 and the host 802. After decrypting the encrypted network packet 832, the secure communication application 897 hands data decrypted from the encrypted network packet 832 to an appropriate application, for example, a web browser, in some embodiments.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method of implementing end-to-end network public key encryption, comprising:
    processing a network packet directed to a destination host by:
        determining whether there is a known cryptographic public key associated with the destination host, wherein the cryptographic public key is accessed when known;
        when no cryptographic public key is known, determining whether the network packet is a first network packet sent to the destination host;
        when it is determined that the network packet is the first network packet, querying a key server requesting access to a cryptographic public key for the destination host using a unique identifier determined based on an IP address of the destination host, wherein the unique identifier is a cryptographic hash based on the IP address of the destination host, wherein the cryptographic public key is accessed when available at the key server;
        when it is determined that the network packet is not the first network packet, placing the network packet in an internal queue associated with the destination host until a cryptographic public key associated with the destination host is available; and
        processing the network packet using the cryptographic public key associated with the destination host prior to transmitting the network packet upon the cryptographic public key associated with the destination host becoming known.

2. The method of claim 1, further comprising:
generating a cryptographic key pair at a second host comprising a cryptographic public key and a cryptographic private key; and
transmitting the cryptographic public key to the key server with a unique identifier associated with an IP address of the second host.

3. The method of claim 1, wherein when the querying indicates the existence of the known cryptographic public key associated with the destination host:
processing a current network packet using the known cryptographic public key.

4. The method of claim 1, wherein the destination host decrypts the network packet using cryptographic private key associated with the destination host.

5. The method of claim 1, further comprising initiating a key regeneration event, comprising the steps of:
generating a new cryptographic key pair at the destination host comprising a new cryptographic public key and a new cryptographic private key;
transmitting the new cryptographic public key to the key server; and
transmitting a message to each other destination host, the message being individually encrypted with the cryptographic public key of each other destination host, wherein the message indicates that a previously used cryptographic public key associated with the destination host is no longer valid.

6. The method of claim 5, wherein the key regeneration event occurs based on a triggering event, the triggering event being initiated manually by a user or automatically according to a predetermined schedule.

7. The method of claim 5, further comprising:
deleting the previously used cryptographic public key of the destination host and treating subsequent traffic to the destination host as the first network packet sent to the destination host.

8. The method of claim 1, further comprising automating configuration of a kernel network module through automated key management comprising the steps of:
configuring a virtual device with an IP address matching an underlying physical network address mapped onto a 1:1 overlay network address space;
configuring an underlying kernel network module so that the cryptographic public key associated with the destination host is used to encrypt traffic addressed to the destination host; and
releasing the network packet to the underlying network kernel to send to the destination host.

9. The method of claim 8, further comprising:
encrypting and sending the network packet via the virtual device to a virtual device associated with the destination host using the cryptographic public key associated with the destination host; and
decrypting the network packet using a cryptographic private key associated with the destination host upon receiving the network packet at the virtual device associated with the destination host.

10. The method of claim 1, further comprising:
generating a unique cryptographic symmetric key for communication between the host and the destination host upon the public key associated with the destination host becoming known to the host;
encrypting and sending the cryptographic symmetric key to the destination host using the cryptographic public key associated with the destination host; and
decrypting the cryptographic symmetric key at the destination host using a cryptographic private key associated with the destination host.

11. The method of claim 10, further comprising:
encrypting and sending the network packet to the destination host using the cryptographic symmetric key; and
decrypting the network packet at the destination host using the cryptographic symmetric key.

12. The method of claim 11, further comprising:
storing the cryptographic symmetric key in a lookup table on the host, wherein the cryptographic symmetric key is associated with the IP address of the destination host;
upon receiving and decrypting the symmetric key at the destination host, storing the cryptographic symmetric key in a lookup table on the destination host, wherein the cryptographic symmetric key is associated with an IP address of the host; and
upon receiving the network packet encrypted with the cryptographic symmetric key at the destination host:
examining a set of metadata of the network packet to determine the IP address of the host that sent the network packet, and
querying the lookup table on the destination host to return the cryptographic symmetric key associated with the IP address of the host to select the appropriate cryptographic symmetric key to decrypt the network packet.

13. The method of claim 1, wherein the unique identifier includes information known only to a sender and the destination host.

14. A non-transitory computer-readable medium encoded with instructions for causing at least one computing device to implement end-to-end network public-key encryption operations comprising:
generating a cryptographic key pair at a host comprising a cryptographic public key and a cryptographic private key;
transmitting the cryptographic public key to a key server with a unique identifier associated with an IP address of the host;
processing a network packet directed to a destination host by:
determining whether there is a known cryptographic public key associated with the destination host, wherein the cryptographic public key is accessed when known;
when no cryptographic public key is known, determining whether the network packet is the first network packet sent to the destination host;
when it is determined that the network packet is the first network packet, querying a key server requesting access to a cryptographic public key for the destination host using a unique identifier determined based on an IP address of the destination host, wherein the unique identifier is a cryptographic hash based on the IP address of the destination host, wherein the cryptographic public key is accessed [if] when available at the key server;
when it is determined that the network packet is not the first network packet, placing the network packet in an internal queue associated with the destination host until a cryptographic public key associated with the destination host is available; and
processing the network packet using the cryptographic public key associated with the destination host prior to transmitting the network packet upon the cryptographic public key associated with the destination host becoming known.

15. The non-transitory computer-readable medium of claim 14, wherein the operations further comprise initiating a key regeneration event upon direction by a user or according to a predetermined schedule by:
   generating a new cryptographic key pair at the destination host comprising a new cryptographic public key and a new cryptographic private key;
   transmitting the new cryptographic public key to the key server;
   transmitting a message to each other destination host, the message being individually encrypted with the cryptographic public key of each other destination host, wherein the message indicates that a previously used cryptographic public key associated with the destination host is no longer valid; and
   deleting the previously used cryptographic public key of the destination host and treating subsequent traffic to the destination host as the first network packet sent to the destination host.

16. The non-transitory computer-readable medium of claim 14, wherein the operations further comprise:
   automating configuration of a kernel network module through automated key management by:
   configuring a virtual device with an IP address matching an underlying physical network address mapped onto a 1:1 overlay network address space;
   configuring an underlying kernel network module so that the cryptographic public key associated with the destination host is used to encrypt traffic addressed to the destination host;
   releasing the network packet to the underlying network kernel to send to the destination host; encrypting and sending the network packet via the virtual device associated with the destination host using the cryptographic public key associated with the destination host; and
   decrypting the network packet using a cryptographic private key associated with the destination host upon receiving the network packet at the virtual device associated with the destination host.

17. The non-transitory computer-readable medium of claim 14, wherein the operations further comprise:
   generating a unique cryptographic symmetric key for communication between the host and the destination host upon the public key associated with the destination host becoming known to the host;
   encrypting and sending the cryptographic symmetric key to the destination host using the cryptographic public key associated with the destination host;
   decrypting the cryptographic symmetric key at the destination host using a cryptographic private key associated with the destination host;
   encrypting and sending the network packet to the destination host using the cryptographic symmetric key; and
   decrypting the network packet at the destination host using the cryptographic symmetric key.

18. A computer-implemented system for implementing end-to-end network public-key encryption, comprising:
   at least one data processor; a key server; and memory storing instructions which, when executed by the at least one data processor, result in operations comprising:
   generating a cryptographic key pair at a host comprising a cryptographic public key and a cryptographic private key;
   transmitting the cryptographic public key to a key server with a unique identifier associated with an IP address of the host;
   processing a network packet directed to a destination host by:
   determining whether there is a known cryptographic public key associated with the destination host, wherein the cryptographic public key is accessed when known;
   when no cryptographic public key is known, determining whether the network packet is a first network packet sent to the destination host;
   when it is determined that the network packet is the first network packet, querying the key server requesting access to a cryptographic public key for the destination host using a unique identifier determined based on the IP address of the destination host, wherein the unique identifier is a cryptographic hash based on the IP address of the destination host, wherein the cryptographic public key is accessed [if] when available at the key server;
   when it is determined that the network packet is not the first network packet, placing the network packet in an internal queue associated with the destination host until a cryptographic public key associated with the destination host is available; and
   processing the network packet using any accessed cryptographic public key prior to transmitting the network packet.

19. The computer-implemented system of claim 18, wherein the operations further comprise: initiating a key regeneration event upon direction by a user or according to a predetermined schedule by:
   generating a new cryptographic key pair at the destination host comprising a new cryptographic public key and a new cryptographic private key;
   transmitting the new cryptographic public key to the key server;
   transmitting a message to each other destination host, the message being individually encrypted with the cryptographic public key of each other destination host, wherein the message indicates that a previously used cryptographic public key associated with the destination host is no longer valid; and
   deleting the previously used cryptographic public key of the destination host and treating subsequent traffic to the destination host as the first network packet sent to the destination host.

20. The computer-implemented system of claim 18, wherein the operations further comprise automating configuration of a kernel network module through automated key management by:
   configuring a virtual device with an IP address matching an underlying physical network address mapped onto a 1:1 overlay network address space;
   receiving the cryptographic public key associated with a destination host; configuring an underlying kernel network module so that the cryptographic public key is used to encrypt traffic addressed to the destination host;
   releasing the network packets to the underlying network kernel to send upon one or more network packets being queued to be sent to the destination host; and
   encrypting and sending the network packets to the destination host according to its cryptographic public key.

21. The computer-implemented system of claim 18, wherein the operations further comprise:
   generating a unique cryptographic symmetric key for communication between the host and the destination host upon the public key associated with the destination host becoming known to the host;

encrypting and sending the cryptographic symmetric key to the destination host using the cryptographic public key associated with the destination host;

decrypting the cryptographic symmetric key at the destination host using a cryptographic private key associated with the destination host;

encrypting and sending the network packet to the destination host using the cryptographic symmetric key; and decrypting the network packet at the destination host using the cryptographic symmetric key.

* * * * *